United States Patent [19]
Rowe et al.

[11] 3,909,605
[45] Sept. 30, 1975

[54] TOPOGRAPHIC DATA PROCESSING SYSTEMS

[75] Inventors: Barry Rowe, Workingham; Harold Frank Rymer, Twyford, both of England

[73] Assignee: Ferranti, Limited, Hollinwood, England

[22] Filed: Nov. 9, 1973

[21] Appl. No.: 414,343

[30] Foreign Application Priority Data
Nov. 21, 1972 United Kingdom ............ 53871/72

[52] U.S. Cl. ................................. 235/152; 35/10.4
[51] Int. Cl.² ............................................. G09B 9/00
[58] Field of Search ............ 235/152, 151; 35/10.4; 340/324 R, 172.5

[56] References Cited
UNITED STATES PATENTS
| | | | |
|---|---|---|---|
| 3,446,903 | 5/1969 | Beizer | 35/10.4 |
| 3,639,736 | 2/1972 | Sutherland | 235/152 |
| 3,801,720 | 4/1974 | Rymer | 35/10.4 |

OTHER PUBLICATIONS
H. R. Puckett, "Computer Method for Perspective Drawing," Journal of Spacecraft & Rocket, 1964, pp. 44–48 (Douglas Aircraft).

*Primary Examiner*—David H. Malzahn
*Attorney, Agent, or Firm*—Cameron, Kerkam, Sutton, Stowell & Stowell

[57] ABSTRACT

A data processing system for processing data relating to topographic features represented by lines on a map includes two stores, a computer and a logic unit. One of the stores contains the cartesian co-ordinates of a plurality of spaced points along the lines whilst the other store contains the individual elements forming the lines between the spaced points. The computer operates to determine which elements may intersect a sight line, which represents an imaginary line extending from a selected point on the map in a required direction along which data is to be processed. The point and the direction of the sight line are variable to meet the requirements of the particular problem. The logic unit determines, for any sight line, the point of intersection between the sight line and an element and the sense of such an intersection.

7 Claims, 9 Drawing Figures

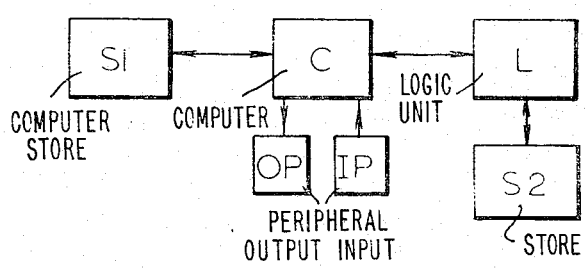
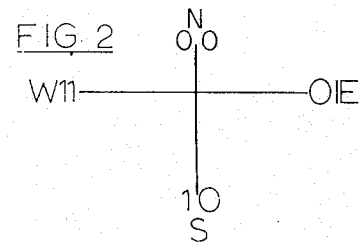
FIG. 1
FIG. 2
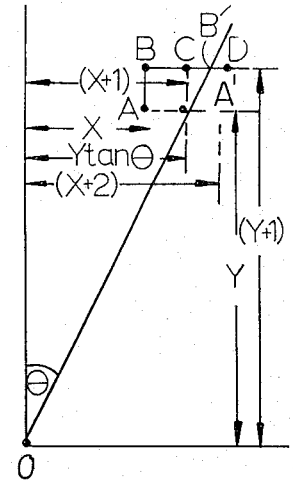
FIG. 4
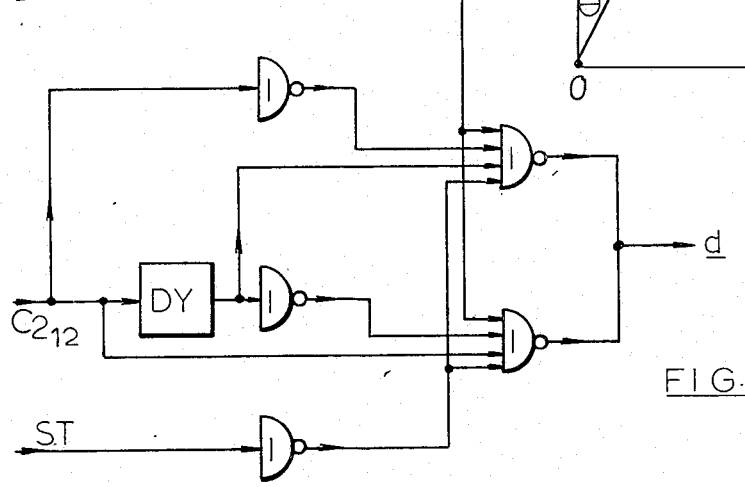
FIG. 8
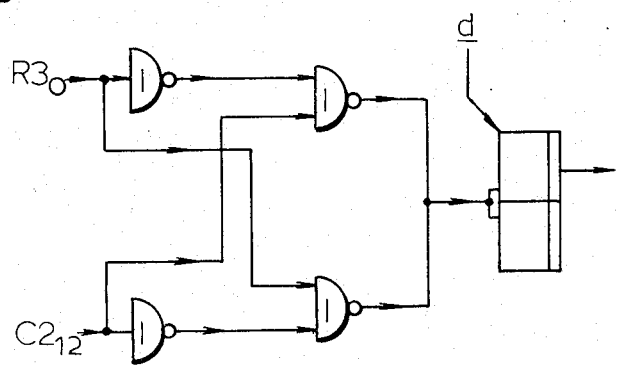
FIG. 9

TOPOGRAPHIC DATA PROCESSING SYSTEMS

This invention relates to data processing systems, and particularly to such systems for processing information defining topographic features.

Topographic features are represented on a map in one of two ways. Many features are represented by different categories of lines, such as contours, roads and railways, rivers, and the outlines of built-up areas or woods. Other features are represented by way may be called "point" symbols, such as buildings of various types and spot heights. These two types of representation, together with words, give all the information which is normally to be found on a map.

If the data defining these and other topographic features is given, in suitable form, to a computer, then many types of problems may be solved very quickly to provide information which would otherwise be obtained only by the expenditure of much time and effort. It would be possible, for example, to obtain details of the probable area coverage of radio or television transmitters.

One of the problems arising from such a requirement is that of storing and processing the necessary data. An area of hilly country many have many miles of contour lines along. It is known however, from co-pending application Ser. No. 193,821, now U.S. Pat. No. 3,801,720, assigned to the assignee of the present invention, to store such information by defining the co-ordinates of a number of spaced points along a particular line, and by storing separately information defining the shape of the line between successive points. The distance between these points, referred to hereafter as "joints," depends upon the shape of the line; for fairly straight lines the joints may be more widely spaced than for lines of complex shape. The line between two joints may be represented by a number of "elements" each in the form of a straight line extending in one of the four cardinal compass directions. If the elements are short enough the succession of elements approximates to the required shape with sufficient accuracy. The set of elements between two joints is referred to as a "span."

It is an object of the invention to provide a system for processing data relating to topographic features represented by lines on a map, in which the lines are represented in the form stated above and wherein sense means are provided for determining the sense of each intersection between a sight line and an element.

By "sight line" is meant an imaginary line extending from a selected point on the map in a required direction, along which data is to be processed. The point and the direction of the sight line are variable to meet the requirements of the particular problem.

According to the present invention there is provided a system for processing data relating to topographic features represented by lines on a map, which includes first storage means operable to store information representing the co-ordinates of a plurality of spaced points along the or each required line, second storage means operable to store information representing a number of sets of elements, each set being defined by one of said spaced points and determining the line between said one point and the next, computer means responsive to signals defining a sight line from a point of origin on said map along which said data is to be processed in a predetermined manner to determine the set or sets of elements relating to a particular topographic feature in which at least on element may intersect the sight line, and logic means connected to the computer means and to the second storage means and operable to determine the presence and location of the or each such intersection, the logic means also including sense means for determining the sense of each intersection between the sight line and an element.

An embodiment of the invention will now be described with reference to the accompanying drawings in which:

FIG. 1 is a block diagram of the complete data processing system;

FIG. 2 illustrates the element coding used;

FIG. 4 illustrates the calculations necessary to determine the intersection between an element and a sight line;

FIGS. 7, 8 and 9 show detail of parts of FIG. 6.

Figure 3:
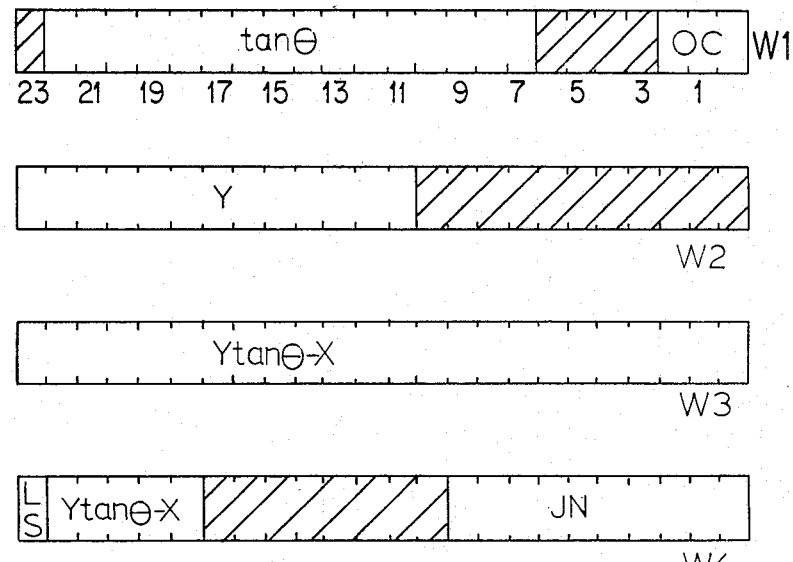
FIG. 3 illustrates the form of the computer output words.

Referring now to FIG. 1, the complete data processing system may be of the general form shown. The system is centred around the computer C which has its own store S1. A second, autonomous, store S2 is provided, associated with a logic unit L. The computer is provided with peripheral input and output units IP and OP respectively.

As already stated, each of the lines on the map representing a topographic feature is divided into spans of convenient length, depending upon the complexity of the line shape. The joints at which adjacent spans meet are defined by their cartesian co-ordinates with respect to some suitable datum, and the co-ordinates are stored in store S1. The datum may conveniently be that of the grid system used on the map. The number of such joints which may be stored is determined entirely by the capacity of the store. The store S1 will also contain data defining the category of the line on which the joints lie, and supplementary information within categories.

The span between adjacent joints is divided up into elements, each of a convenient length. This will depend upon the scale of the map; for a map scale of 1 in 63360, the common 1 inch to 1 mile scale, an element length of say 25 meters is suitable. The information relating to the elements is stored in the autonomous store S2, each element being represented by two bits of data. As illustrated in FIG. 2, two bits are sufficient to indicate the direction of an element from the end of the preceding element. Hence a span is represented by a number of pairs of bits, in this case up to 192 pairs using 16 words of 24 bits.

The type of processing to be performed by the system always depends upon a particular sight line. For example, in producing field strength charts for radio transmitters it is necessary to determine whether a point on the map is visible from the transmitter site, as this will affect the field strength at that point. Such a calculation has to be performed in all directions in which the information is required. Hence the basic question to be answered is "Is point B visible from point A?" Similarly the height of a point on the map may be determined by "looking" towards the nearest contour line in any arbitrary direction, taken note of the height represented by the contour line, and deciding whether the point is higher or lower than the contour line. Even the course of, for example, a road may be defined by determining the intersections between a series of arbitrary sight lines and the spans defining the road.

It is necessary to adopt a consistent convention when digitising the information for feeding into the stores. A convenient convention is, for example, to ensure that line features are digitised in the sense that the line features always run clockwise around the nearest high ground, that is, the higher ground is always on the right of the feature looking in the direction of digitisation. In this way the sense in which an element of a span crosses the sight line indicates whether the intersection is higher or lower than the point of origin of the sight line.

All the calculations therefore require the definition of a line extending in some direction from a point. This line takes the point as an origin and makes an angle $\theta$ with the nearest cardinal direction; $\theta$ therefore never exceeds 45°.

The computer C provides for the logic unit parameters relating the selected point and the selected angle $\theta$ to the coordinates of a number of joints. These joints may comprise all those in a particular category (e.g. 400 ft. contours) and a particular geographical area. This area may be, for example, a 10 kilometer map square or may be more precisely computed to include only joints whose associated spans could possibly intersect the sight line.

Figure 5:
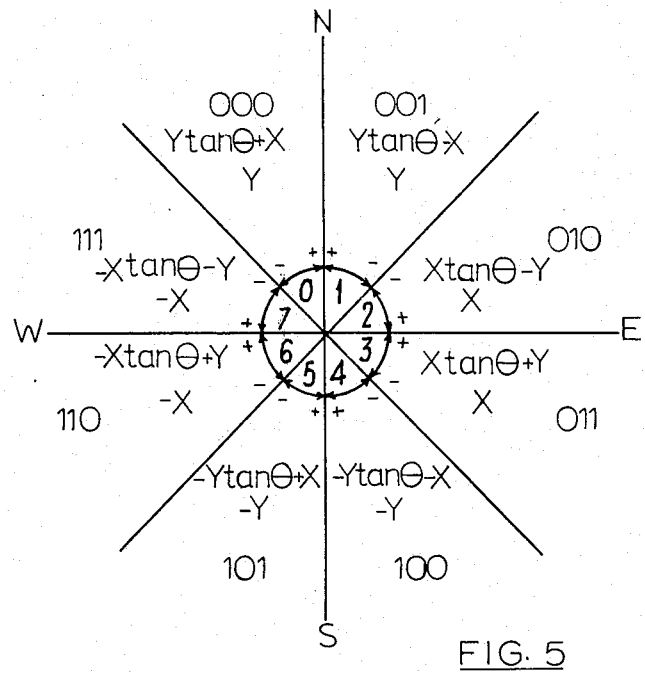
FIG. 5 illustrates the octant coding used in the computer output words.

The parameters of the joint are provided in the form of four 24-bit words shown in FIG. 3. The parameters comprise Y, Ytan$\theta$ — X (where X and Y are the Cartesian co-ordinates of the joint transformed relative to an origin at the selected point) the joint number and an indication of the octant in which the site line is located. FIG. 5 shows the octant coding used and the expression of the form Y, Ytan $\theta$ — X used in each octant; the examples taken in this application refer to the first octant (North to North East).

The four words defining each joint are passed to the logic unit L. As shown in FIG. 3, word W1 contains the threebit octant code in bits 0 to 2, together with 16 bits denoting tan$\theta$ in bits 7 to 22. Word W2 carries only 13 bits defining Y. Ytan$\theta$ — X is defined by a 29-bit number which occupies all of word W3 and bits 18 to 22 of word W4. Word W4 also carries the joint number JN in bits 0 to 9 and, where appropriate, a single bit LS denoting that the span defined by the joint is the last available.

It is now necessary to describe the technique used to determine which element or elements of a span intersect the sight line, and the direction (clockwise or anticlockwise with respect to the origin of the sight line) in which this or each intersection occurs. FIG. 4 illustrates the principles involved. Each element of a line is drawn in either a North-South or an East-West direction, the actual direction being indicated by a two-bit code as shown in FIG. 2. Thus the line drawn is not an exact representation of the real line, but a close approximation to it. The computer has already calculated the values of Y and Ytan$\theta$ — X for a joint having a span which might intersect the sight line, and the autonomous store S2 contains the two-bit code defining each element of the span. In FIG. 4 the position of the origin of the sight line is indicated at O and the joint is at A, having cartesian co-ordinates X and Y relative to the origin O. The actual sight line is indicated, at an angle $\theta$ to the North direction, and the cartesian coordinates of the corresponding point on the sight line, A', are Ytan$\theta$ and Y. The displacement AA' and Ytan$\theta$ — X, are positive quantities. If the first element AB is in a North direction, and its end has co-ordinates X and (Y + 1), then the corresponding point B' on the sight line is such that the displacement BB' is (Y + 1)tan$\theta$ — X. This is the distance in a horizontal direction between the end of the element and the sight line, and is also a positive quantity. Hence the element AB does not cross the sight line. Similarly, if the next element BC is in the East direction, the corresponding point on the sight line is still B'. The co-ordinates of C are (X + 1), and (Y + 1), and the distance CB' is (Y + 1)tan$\theta$ — (X + 1). This is still positive. The next element CD is also in an East direction, and the co-ordinates of D are (X + 2) and (Y + 1). The corresponding point on the sight line is still B', and the displacement DB' is (Y + 1)tan$\theta$ — (X + 2). This quantity is negative, and this indicates that the element CD crosses the sight line.

The procedure detailed above is repeated for each element in a span or batch of spans offered to the logic unit L by the computer C. Two configurations of the logic unit are to be described, each being designed to perform a particular function. The configurations are basically similar, as will become apparent.

Figure 6:
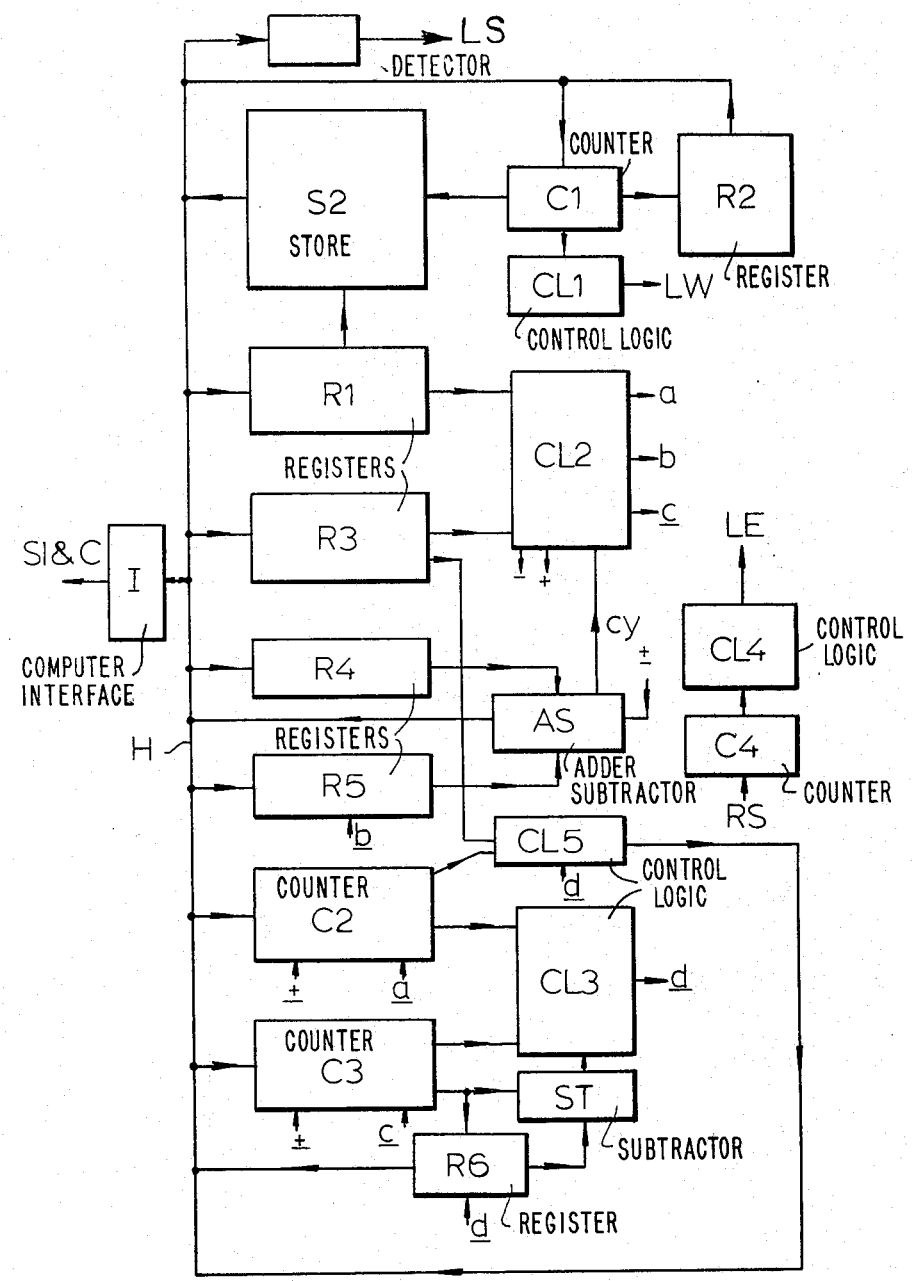
FIG. 6 illustrates one form of the logic means of FIG. 1.

The logic shown in detail in FIG. 6 is arranged to return to the computer C the distance Y from register R6 which corresponds to that intersection in the batch of spans investigate which is nearest to the origin O. FIG. 6 shows also the autonomous store S2. The store and the various items of the logic unit are linked via a 24-bit data highway H which is connected via an interface I to the computer C, only the data highway and inputs are shown, the clock and shift inputs being omitted for the sake of clarity. The sequence of operations will be apparent from the description given later.

The input to the store S2 is by way of a register R1 communicating directly with the highway H. Also applying an input to the store is a counter C1, which also applies input to a register R2 and to control logic CL1. A register R3 also receives inputs from the highway, and the two registers R1 and R3 apply inputs to control logic CL2. Two further registers R4 and R5 receive inputs from the highway and feed an adder/subtractor AS which applies signals to the highway on receipt of the appropriate add or subtract signals. Counters C2 and C3 are bidirectional counters, and are controlled by outputs from the control logic CL2, and apply inputs to control logic CL3. Counter C3 also feeds a register R6 which is controlled by an output of control logic CL3. The output of the register R6 is also subtracted from the contents of counter C3 in a subtractor ST and the result passed to the control logic CL3. Control logic CL5 is fed with outputs from C2 and R3, and an output from CL3, and has itself an output onto the highway. The remaining units are a counter C4 supplying control logic CL4, and a bistable unit giving a "last span" signal LS.

The operation of the logic unit of FIG. 6 will now be described with reference also to FIG. 4.

As already stated, the computer determines the parameters of all joints in a particular batch concerned with a particular sight line and passing these to the store S2 and the associated logic. The octant code, bits 0 to 2 of word W1, are stored in register R3, whilst the 16 bits 7 to 22 defining tan$\theta$ for the joint are stored in register R4. The value of Y, contained in bits 11 to 23 of word W2, is passed to counter C3, whilst the most significant 13 bits of $Y\tan\theta - X$, bits 11 to 23 of word W3, are passed to counter C2. The remainder of the bits defining $Y\tan\theta - X$, bits 0 to 10 of word W3 and bits 18 to 22 of word W4, are stored in register R5. The joint number, bits 0 to 9 of word W4, are passed to counter C1. Counter C1 also stores a further four bits which define one of the 16 words in store S2 covering the span associated with that particular joint.

The values of Y, $Y\tan\theta - X$, and joint number for a number of joints may be stored in the spare capacity of store S2 via register R1, and then read from there into the registers and counters specified above. For this purpose an address is required for the locations of stores S2 to contain these words. This is held in register R2, and passed to counter C1 before reading the words out.

Figure 7:
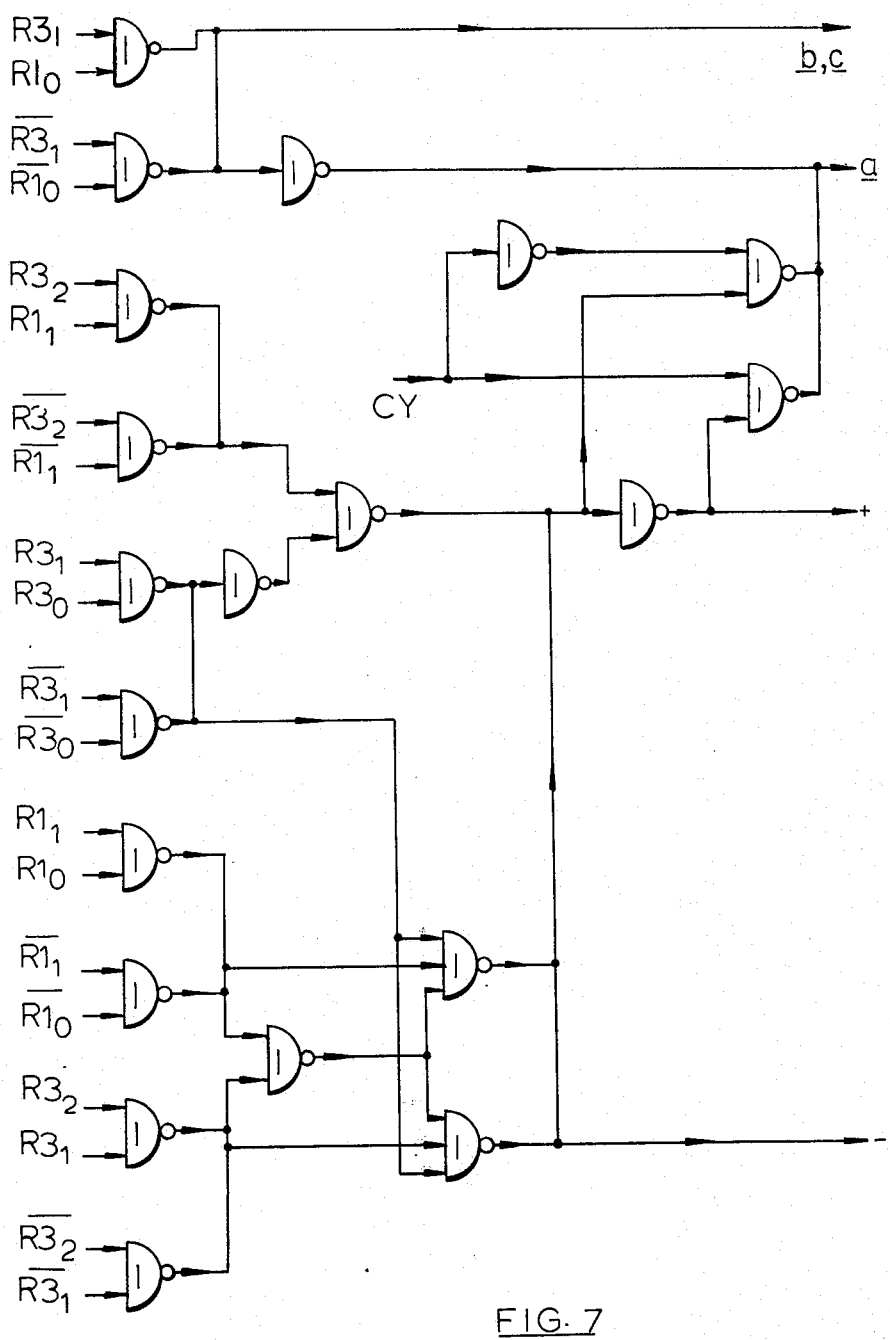

The fourteen bits in counter C1 are used to address the store S2 and hence transfer the first one of these 16 words to the register R1. Each element is defined by two bits of this word; hence the first two bits are passed to the control logic CL2. Similarly the three bits defining the octant are applied to CL2 from the register R3. Considering the element AB of FIG. 4, the element code is 00, whilst the octant code is 001. FIG. 7 shows the control logic CL2 to which these inputs are applied. The two element bits from register R1, being bits 0 and 1 are denoted as $R1_0$ and $R1_1$. Similarly the three octant bits in register R3, being bits 0, 1 and 2, are denoted $R3_0$, $R3_1$ and $R3_2$ respectively.

The first element AB, having the element and octant codes mentioned above, applies inputs to the control logic CL2 such that the logic derives pulses b and c which are applied to register R5 and counter C3 respectively, and the + control signal applied to the adder/subtractor AS, and counters C2 and C3. Counter C3 increases its count by 1 to denote the change from Y to Y + 1 (see FIG. 4). The + control signal applied to adder/subtractor AS causes the value of $\tan\theta$ in register R4 to be added to the least significant part of $Y\tan\theta - X$ from register R5. The resultant sum is $(Y + 1)\tan\theta - X$, denoting the distance BB', and this is put into register R5 via the highway. If this addition should result in a "carry" CY from the adder/sutractor AS, then control logic CL2 would also produce the a pulse, causing the count in counter C2, the most significant part of $Y\tan\theta - X$, to be increased by 1. The value of $\tan\theta$ in register R4 remains unchanged for any particular sight line.

Control logic CL3 checks for changes in the sign bits held in counters C2 and C3. Detail of the control logic is shown in FIG. 8. The logic is a simple gating network with a delay unit DY arranged to provide a delay equal to the time taken to process one element. The inputs to CL3 are denoted as $C2_{12}$ and $C3_{12}$, using the same notation as before. The remaining input to the logic CL3 is the output of the substractor ST, which denotes the sign of the difference between the contents of counter C3 and register R6. This last-mentioned output is necessary to ensure that there is no output from CL3 unless the present value of Y is less than the previous value of Y. The delay enables these two values to be compared. The subtractor output is normally '1,' and the sign bits from the two counters depend upon the existence of an intersection between the element and the sight line. In the case of element AB on FIG. 4 the sign bit of counter C3, that is bit $C3_{12}$ will be '0.' The sign bit $C2_{12}$ is also '0' for element AB, and hence there is no d pulse output from the control logic CL3.

Control logic CL5 depends for its operation on the presence of the d pulse from control logic CL3. Hence the operation of CL5 will not be described at this stage.

The next two bits from store S2, denoting the element BC, are now transferred to register R1. Since this element is in the same octant, the three bits from register R3 applied to control logic CL2 are unchanged. However, element BC is an easterly directed element and hence the element code is 01 (see FIG. 2). Thus the bit $R1_0$ from register R1 applied to control logic CL2 is changed. As will be seen from FIG. 7, control logic CL2 now produces only pulse a and the − control signal. The result of this is to cause the count in counter C2 to be reduced by 1, from its latest value of $(Y + 1)\tan\theta - X$ to $(Y + 1)\tan\theta - (X + 1)$. The sign bit of this is unchanged, and hence there is still no d pulse from control logic CL3 and control logic CL5 is inoperative.

The third element CD is denoted by the digits 01, as was element BC. Hence when this element is fed to register R1 control logic CL2 again produces the a pulse and the − control signal. The count in counter C2 is further reduced to $(Y + 1)\tan\theta - (X + 2)$, this denoting the distance CB'. The sign bit of the term stored in counter C2 now changes, since the end of the element CD is on the opposite side of the sight-line OB' to the beginning of the element. Control logic CL3 responds to this sign change to produce the d pulse, since the sign of (Y + 1) in counter C3 remains unchanged.

Register R6 is initially set to a value much greater than any possible value of Y, hence the presence of the d pulse allows the contents of register R6 to be changed to the new value (Y + 1) from counter C3.

Control logic CL5 is shown in FIG. 9, from which it will be seen that it comprises a gating network and a bistable circuit. The inputs to the gating network are the sign bit of counter C2, bit $C2_{12}$, and the least significant bit of the octant code held in register R3, bit $R3_0$. It will be seen from FIG. 5 that the expression $Y\tan\theta - X$, or the equivalent expression in other octants, changes sign when an element crosses the sight line. The expression is positive for points on that side of the sight line nearer to the cardinal direction. Hence for the odd octants (1, 3, 5 and 7 in FIG. 5) the expression will be negative if the intersection is made in a clockwise direction. The condition of the bistable circuit is thus consistent irrespective of the octant in which the intersection occurs.

In the present instance, the least significant bit of the octant code, bit $R3_0$ is '0' whilst the sign bit from counter C2 has changed from '0' to '1.' The gating network of control logic CL5 operates to apply a '1' to the shift input of the bistable circuit during the presence of the d pulse which is applied to the clock input of the bistable device. The bistable device is thus set, denoting the intersection of the sight line with a clockwise element.

The output of control logic CL5 is applied over highway H to the computer to denote the sense of the intersection whose location is represented by the contents of register R6.

The above process is repeated for all remaining elements. If a second intersection occurs between the sight line and an element, and the Y value of this intersection is less than the value stored in register R6, then the output of the subtractor ST is negative, causing control logic CL3 to produce the *d* pulse to up-date the contents of register R6 and activate control logic CL5 to determine the sense of this new intersection. The absence of an output from the bistable circuit of CL5 when a nearer intersection occurs indicates that this intersection is with an anti-clockwise element.

It has been mentioned that the control logic CL5 operates to determine the sense in which an intersection of a span and a sight line occurs (clockwise or anti-clockwise as seen from the origin of the sight line). The purpose of this feature must now be described. By means of a sight line in any arbitrary direction, it is possible without use of the sense detection to determine the nearest contour in that direction to any given point. This will give the height of the chosen point only to within a bracket equal to twice the vertical interval between the contours, since the measurement does not reveal whether the point is above or below the contour. If, by convention, the map information is initially digitised and stored with the sense that contours always run clockwise around high ground, i.e., that the higher ground is always to the right looking along the contour in the direction of digitisation, then the direction in which the nearest span of a contour crosses a sight line indicates whether the origin of that sight line is above or below the contour, i.e., it determines the height to within the vertical interval. With the convention chosen, clockwise intersection indicates an origin above the contour, anti-clockwise below. The converse convention is equally applicable and is also covered by this application.

Other closed loops, for example, the perimeters of lakes, built up areas or woods are also digitised with a conventional direction: by the same means therefore it is possible for the computer to determine whether a given point is within or outside such a closed loop.

In order to determine, for example, the question of the visibility of one point from another it is necessary for the computer to be told the sense of every intersection, not only of the nearest intersection to the point of origin of the sight line. To do this, the logic of FIG. 6 is modified in that the subtractor ST is removed or disabled. This allows the *d* pulse to be produced by all intersections on the sight line, the value of Y for each intersection being passed to the computer via register R6 and the sense of each being determined by logic CL5. The processing proceeds exactly as already described except for these differences. The computer then processes this information as required.

Control logic CL4 is a four-input AND gate operable to signify by a signal LE that the last element of a word has been processed. Counter C4 is then reset by signal RS and counter C1 indexed to read the next word read into register R1. Similarly control logic CL1 is a four-input AND gate which indicates by an output LW when the last word in store S2 associated with the span in question has been passed to register R1. In this case the next output from CL4 does not cause counter C1 to be indexed, but causes values of Y, $Y\tan\theta - X$ and the joint number for the next joint in the store to be put into counter C3, counter C2, register R5 and counter C1 respectively.

The last span listed by the computer is denoted by bit 23 of word 4 (see FIG. 3) of the appropriate joint data. This is detected by the last span detector LS when this data is read from store S2, and causes the value in register R6 and the state of the bistable circuit in control logic CL5 to be returned to the computer C via the interface I on completion of the last element of the last word of span data for this joint. The computer first determines whether or not this represents an intersection. If so, since the particular value of $\theta$ is known, and the register gives the value of Y, the computer is able to calculate the length OB' to the intersection along the sight line.

The method just described for determining intersections between elements and the sight line is extended to sight lines in other octants, and extending in other directions. The control logic produces the required + or − control signal and any of the pulses *a*, *b* and *c* as appropriate.

The results of the determination may be used by the computer in various ways. For example, in order to answer the question "Is point B visible from point A?" the computer will "draw" a sight line extending from the lower of these points to the higher point. Given the height of the two points, the computer calculates the angle of sight of the sight line, that is its inclination to the horizontal. Each contour line intersecting the sight line is treated as above, and the computer is then presented with a list of the nearest distances from the lower end of the sight line at which each counter crosses the sight line. The question of obstruction may then be settled in several ways. One is to determine the angle of inclination of the line joining the lower end of the sight line to the point of intersection with each contour. If any such angle is greater than the angle of the sight line, then obstruction occurs.

An alternative method may be used for intervisibility calculations. According to this method, the computer first determines the angle of sight between the lower station A and the higher station B, and the value of Y corresponding to the projected distances from A at which this inclined line of sight reaches the nominal heights of each contour intermediate in height between A and B. The computer offers to the logic unit in turn the values of Y thus obtained, to be stored in R6 instead of the initial large value, with the normal data on contour spans at the corresponding height using A as the origin. If a pulse *d* is produced the stations are not intervisible and no further spans need be processed. If pulse *d* is not produced the computer then offers to the logic unit all higher contours which may intervene, with a value of Y, to be stored in R6, corresponding to that for the point B. Again, if the pulse *d* is produced, the stations are not intervisible, and no further spans need be processed. If the whole process does not produce a pulse *d* the stations are intervisible. The high contours may alternatively be processed before the intermediate ones.

Many other problems relating to topographic features may be solved by similar techniques, using other forms of logic means.

The use of four 24-bit words to control the operation of the logic unit and associated store is only one way in which the invention may be put into effect. A dsifferent number of words of different length but containing the same information could be used. The coding of the octants and quadrants shown in FIGS. 5 and 2 may also be varied. The number of elements per span, and thus of words per span, may be varied.

The expressions Y, $Y\tan\theta - Y$, and $\tan\theta$ may be processed to a different order of accuracy using different numbers of bits. It is possible to change the logic configuration from that shown in FIG. 6 whilst still maintaining the facilities described above.

What we claim is:

1. A system for processing data relating to topographic features represented by lines on a map, which includes first storage means for storing information representing the coordinates of a plurality of spaced points along the or each required line, second storage means for storing information representing a number of sets of elements each set being defined by one of said spaced points and determining the line between said one point and the next, computer means operably connected to said first storage means and being responsive to signals defining a sight line extending from a selected point on said map in a required direction along which said data is to be processed in a predetermined manner for determining the set or sets of elements relating to a particular topographic feature in which at least one element may intersect the sight line, and logic means connected to the computer means and to the second storage means and operable to determine the presence and location of the or each such intersection, the logic means including sense means for determining the sense of each intersection between the sight line and an element.

2. A system as claimed in claim 1 in which the sense means includes a bistable circuit adapted to receive a clock input and clock means for generating said clock input only when an intersection occurs between the sight line and an element.

3. A system as claimed in claim 2 in which the clock input occurs only when such intersection is located nearer to the point of origin of the sight line than was the previous intersection.

4. A system as claimed in claim 1 including a clock means for generating a clock input to said sense means, said sense means being responsive to a signal representing the direction of an element which intersects the sight line and to a signal representing the octant in which the said element and the sight line are located.

5. A system as claimed in claim 4 in which the sense means includes a bistable circuit adapted to receive the clock input which occurs only when an intersection occurs between the sight line and an element.

6. A system as claimed in claim 4 in which the sense means includes gating means operable to invert the signal representing the direction of the intersecting element in alternate octants.

7. A system as claimed in claim 6 in which the sense means includes a bistable circuit adapted to receive the clock input which occurs only when an intersection occurs between the sight line and an element.

* * * * *